US008489213B2

(12) United States Patent
Lim et al.

(10) Patent No.: US 8,489,213 B2
(45) Date of Patent: Jul. 16, 2013

(54) PORTABLE DIGITAL MEDIA DEVICE WITH A FORCE SENSOR

(75) Inventors: Hong Chiang Lim, Singapore (SG); Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 971 days.

(21) Appl. No.: 12/089,526

(22) PCT Filed: Oct. 6, 2006

(86) PCT No.: PCT/SG2006/000298
§ 371 (c)(1),
(2), (4) Date: Jul. 18, 2008

(87) PCT Pub. No.: WO2007/043978
PCT Pub. Date: Apr. 19, 2007

(65) Prior Publication Data
US 2008/0319561 A1    Dec. 25, 2008

(30) Foreign Application Priority Data
Oct. 7, 2005    (SG) .............................. 200506578-4

(51) Int. Cl.
*G06F 17/00*    (2006.01)
(52) U.S. Cl.
USPC .......................................................... 700/94
(58) Field of Classification Search
USPC    361/679.34; 345/173, 159; 701/46; 711/112; 369/53.17, 275.2; 700/245; 702/141; 84/636; 360/60; 377/24.1; 341/33; 710/260
See application file for complete search history.

(56) References Cited

U.S. PATENT DOCUMENTS

| 6,278,902 | B1 * | 8/2001 | Hashimoto et al. | 700/245 |
| 6,480,375 | B2 * | 11/2002 | Horikoshi et al. | 361/679.34 |
| 6,622,192 | B2 * | 9/2003 | Chou et al. | 710/260 |
| 6,836,744 | B1 * | 12/2004 | Asphahani et al. | 702/141 |
| 6,940,940 | B2 * | 9/2005 | Kranz | 377/24.1 |
| 7,091,886 | B2 * | 8/2006 | DePue et al. | 341/33 |
| 2003/0076301 | A1 * | 4/2003 | Tsuk et al. | 345/159 |
| 2003/0076306 | A1 * | 4/2003 | Zadesky et al. | 345/173 |
| 2003/0093201 | A1 * | 5/2003 | Schubert et al. | 701/46 |
| 2005/0049113 | A1 | 3/2005 | Yueh et al. | |
| 2005/0050266 | A1 * | 3/2005 | Haas et al. | 711/112 |
| 2005/0126370 | A1 * | 6/2005 | Takai et al. | 84/636 |
| 2005/0174676 | A1 * | 8/2005 | Lin | 360/60 |
| 2006/0044977 | A1 * | 3/2006 | Chen | 369/53.17 |
| 2007/0140095 | A1 * | 6/2007 | Rast | 369/275.2 |

FOREIGN PATENT DOCUMENTS

DE    420000814 U1    5/2004
EP    1501007 A2 *    1/2005

(Continued)

OTHER PUBLICATIONS

DE 420000814 U1, May 2004, Derwent, Partner tech corporation.*

*Primary Examiner* — Asad Nawaz
*Assistant Examiner* — Parth Patel
(74) *Attorney, Agent, or Firm* — Creative Technology Ltd

(57) ABSTRACT

There is provided a portable digital media device, including: a storage device; a force sensor coupled to the storage device; a display; and a controller coupled to both the storage device and the display, wherein the display shows information. The device may also be used as a cursor control and input device when connected to a computer. Other applications of the device are also disclosed.

11 Claims, 3 Drawing Sheets

FOREIGN PATENT DOCUMENTS

| | | |
|---|---|---|
| JP | 09167028 A | 6/1997 |
| JP | 09212462 A | 8/1997 |
| JP | 2001033562 A | 2/2001 |
| JP | 2003242477 A * | 8/2003 |

* cited by examiner

PORTABLE DIGITAL MEDIA DEVICE WITH A FORCE SENSOR

FIELD OF INVENTION

This invention relates to a portable digital media device with a force sensor that aids in minimizing shock-induced damage. Such a portable digital media device is also usable as a step counter amongst other applications.

BACKGROUND

The increasing compact nature of portable digital media players has driven the development of hard disk drives of decreasing sizes. However, despite the small sizes of hard disk drives, they still function the same way as large disk drives. All disk drives employ a servo system which controls the radial position of an actuator arm relative to a rotating recording disk. The actuator arm supports a read/write head or transducer in cantilevered fashion above the disk. Ideally, the read/write head is maintained over the center of a selected track in the disk surface. The read/write head senses position information from the track, which is then used to develop a position error signal. The error signal is fed back through a compensator into a drive motor for the actuator arm to move the read/write head in a direction to reduce the error.

Disk drives used in portable digital media players may experience an immense shock from being dropped or severely jolted. For example, when the media player containing a small disk drive (such as a 1 inch disk drive) falls from a desk or user's hand onto a hard floor, the impulse generated at impact can be quite large—up to hundreds or thousands of g's. Such disturbances are in the form of vibrations which could, if sufficient in strength, cause the disk to move relative to the read/write head, resulting in an off track error.

The external shock yields two undesirable outcomes: physical damage and track mis-registration. With respect to the first, the shock pulse may cause significant physical damage to the disk drive. A pulse of sufficient magnitude and orientation can overcome the air gap bearing which separates the slider from the rotating disk, thereby damaging one or more of: the magnetic media film, the disk substrate, or the slider.

With respect to the second, the external disturbance imposes linear and radial accelerations that apply a moment to the actuator arm. This moment may exceed the tracking servo system's ability to maintain the read/write head within the allocated tracking error range required for acceptable data integrity. This problem is exacerbated by the increased track density of smaller disk drives which reduces the acceptable tracking error range. If a shock occurs during the data writing process, the disk drive is in jeopardy of miswriting the data off track, or worse, over previously written data on adjacent tracks.

The present invention concerns disk drives and associated methods for detecting shock-inducing events, such as free fall conditions, and taking protective action to minimize the damage and errors induced by such shock.

SUMMARY

There is provided a portable digital media device, including: a controller; a storage device; a force sensor coupled to the controller; and a display; wherein the display shows information. The storage device may be either flash memory or a hard disk drive. The force sensor may either be incorporated in the storage device or connected externally to the controller. It is preferable that the display is either a LCD or OLED screen. Advantageously, the force sensor is able to detect accelerations in the x, y and z axes.

Preferably, the display can show information that relates to data in the storage device or movement of the digital device/storage device. The display may also show information that relates to impact on the digital device/storage device. The device may also be used as a data logger and may also provide indications when the sensor detects large accelerations over a predetermined period of time.

There is also provided a method to protect data stored in a storage device of a portable digital media device during free-fall and when a decreasing acceleration from at least one axes is detected. It includes continuously logging data obtained by a force sensor in the device; with a controller in the device cutting power to the storage device at an instance when readings of 0 m/s$^2$ along all three directions of axes x, y and z, or when decreasing readings of acceleration from at least one axes is obtained from the force sensor. It is preferable that data from the force sensor is logged over a pre-determined period and data from an earlier pre-determined period is overwritten by data from a present period. Advantageously, the times, and incidence of the cutting of power to the storage device are stored in the digital device.

There is provided a method to count a number of steps a moving user takes using a portable digital media device. The user may be engaged in an activity selected from the group comprising: walking, jogging and running. The method includes continuously logging data obtained by a force sensor in the device; triggering a step-counting mode in the device, with a controller in the device monitoring for a pre-determined time where spikes are regularly detected in an axis selected from the group comprising: x, y, and z. The controller then tags that axis as the designated axis; and increases a step count by one whenever a spike in the designated axis is obtained from the force sensor. Advantageously, the number of steps is re-settable. In addition, the controller in the portable digital media device may select a song from a storage device in the media device with a beat frequency that matches the detected spike frequency for the user. The step-counting mode may be triggered by invoking a control such as, for example, a button, a switch, or a touchpad on the media device.

A method to determine a near-instantaneous speed of a moving user using a portable digital media device is also disclosed. The method includes continuously logging data obtained by a force sensor in the device; triggering a step-counting mode; with a controller in the device monitoring for a pre-determined time where spikes are regularly detected in an axis selected from the group comprising: x, y, and z. The controller then tags that axis as the designated axis; and increases a step count by one whenever a spike in the designated axis is obtained from the force sensor. The user may then input a distance covered by a step to the controller; and the controller preferably calculating the near-instantaneous speed of the user with a predetermined formula.

In another aspect of the present invention, there is provided a portable digital media device, including: a storage device; a force sensor coupled to the storage device; a display; and a controller coupled to both the storage device and the display. Advantageously, the portable digital media device may act as a cursor control and input device when connected to a computer either via a wire or wirelessly. The wirelessly protocol used may be Bluetooth, UWB, RF or IR. It is preferable that the media device is connected to the computer via a wire for the charging of a power source of the portable digital media device and/or for downloading content into the portable digital media device.

It is preferable that a cursor on a display of the computer moves at a rate corresponding with the accelerations detected by the force sensor and the controls on the media device may used to select options on a display of the computer. It is also preferable that the cursor control is done using coordinate systems.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The following discussion is intended to provide a brief, general description of a suitable computing environment in which the present invention may be implemented. As those skilled in the art will appreciate, the invention may be practiced with other computer system configurations, including hand-held devices, multiprocessor systems, microprocessor-based or programmable consumer electronics, minicomputers, and the like.

Figure 1A:
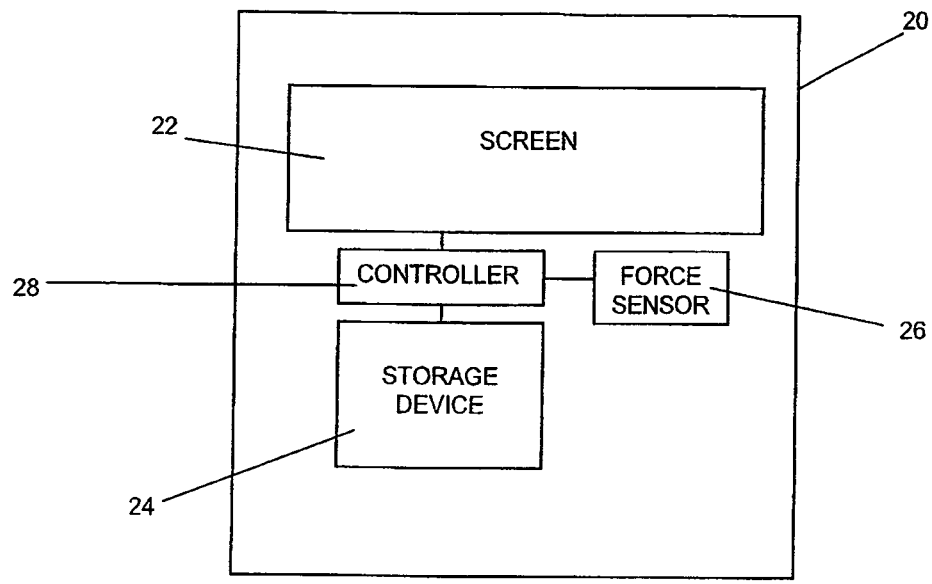
FIG. 1 is a schematic diagram of a preferred embodiment.
Figure 1B:
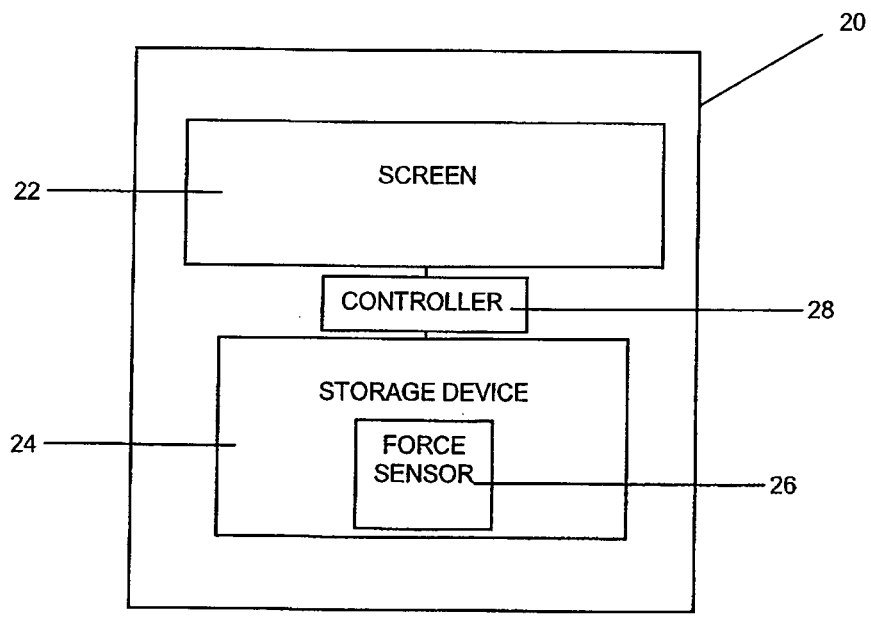

Referring to FIGS. 1A and 1B, alternative embodiments of a portable digital media device 20 are shown. The device 20 may include a storage device 24. The storage device 24 may be flash memory or a hard disk drive. The memory capacity of the storage device 24 may be at least 32 MB and should be non-volatile. The size of the hard disk drive being used is determined by the form factor of the device 20.

The device 20 may also include a force sensor 26 coupled to a controller 28. The force sensor 26 is an accelerometer that measures acceleration in the x, y and z axes and is able to compute the g-force exerted on the device 20. The sensor 26 may be obtained from ST Microelectronics, Hitachi Metal, Hokuriku Electric Industry Co Ltd or MEMSIC Inc. It is preferable that the force sensor 26 is able to detect acceleration in a lateral plane (x, y axes) and a vertical plane (z axis). FIG. 1A shows an embodiment where the sensor 26 is externally connected to the controller 28 while FIG. 1B shows an embodiment where the sensor 26 is incorporated into the storage device 24. Functionally, there is no discernible difference between both embodiments despite the difference in the positioning of the sensor 26. However, when the sensor 26 is incorporated into the storage device 24, it would be more precise to treat the readings from the sensor 26 to be what is experienced by the storage device 24 rather than what is experienced by device 20. There is a slight difference because the storage device 24 is not rigidly attached to the device 20.

In addition, the device 20 may include a display such as, for example, a screen 22. The screen 22 may be an LCD or an OLED. The screen 22 may preferably be able to display graphics and may be in colour, but may also be monochromatic. The screen 22 may display information that relates to data in the storage device 24, such as, for example, file names, song titles, song durations, artiste names, and so forth. The screen may also display information that relates to movement of the device 20, or the storage device 24. This depends on whether the sensor 26 is within or external to the storage device 24. An example of information relating to movement of the device 20 is the force experienced (calculated using mass of the device 20 X last recorded largest acceleration amongst the x, y and z axes before impact with a surface) by the device after impact with the surface.

The device 20 may also include a controller 28 to run the device 20 in all ways and functionality that it was intended for. The controller 28 may be coupled to both the screen 22 and the storage device 24.

Figure 2:
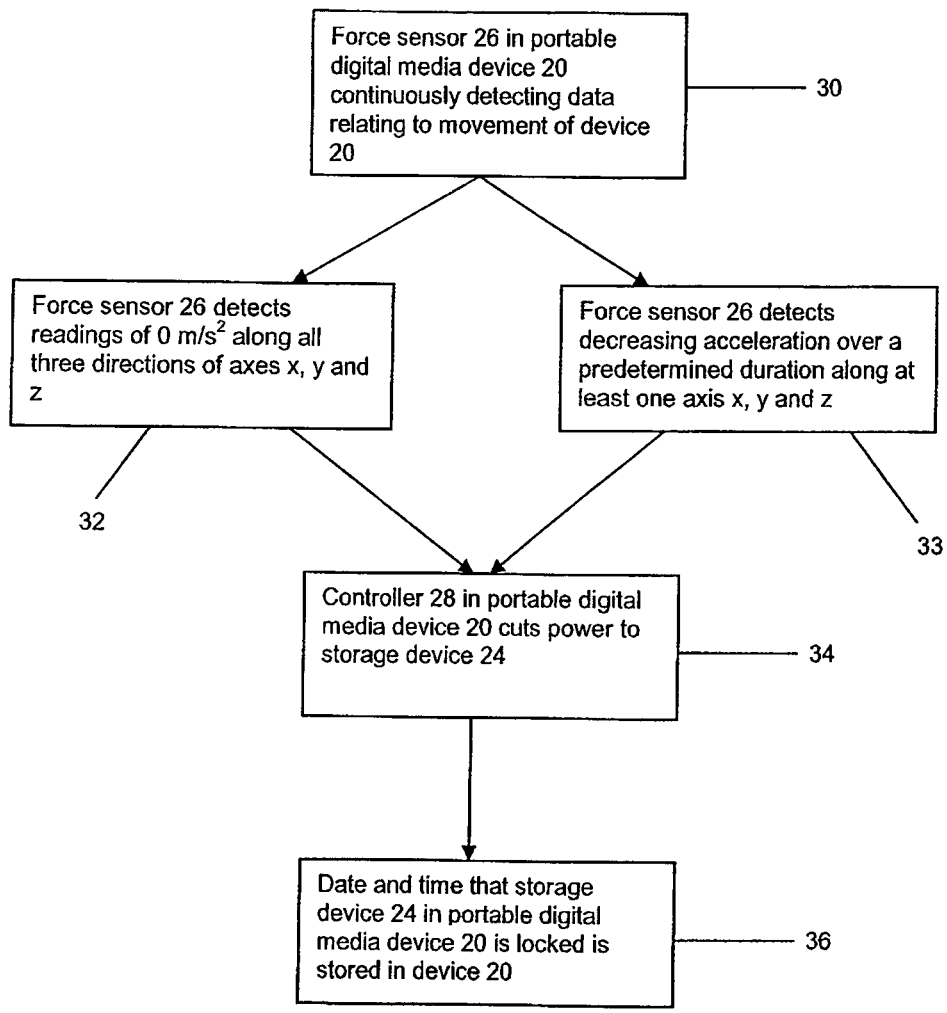
FIG. 2 is a process flow diagram for protecting data stored in the preferred embodiment.

Referring to FIG. 2, there is shown a process diagram of a method to protect data stored in the storage device 24 of the portable digital media device 20 during and when about to go into free-fall. In the device 20, the force sensor 26 is continuously detecting data relating to movement of the device 20 (30). When the force sensor 26 obtains readings of 0 m/s$^2$ along all directions of axes x, y and z (32) or when the sensor 26 obtains a decreasing acceleration over a predetermined duration in at least one of the axes x, y and z (33), the controller 28 in the device 20 either cuts power to the device 20, or just the storage device 24 (34). The predetermined duration may be one second at the maximum and may also be considered in milliseconds. Cutting power to the storage device 24 may prevent damage to the storage device 24 and all data stored in the storage device 24. Damage prevention of the storage device 24 and all data stored in the storage device 24 may be constrained by how fast the moving parts such as the read/write arm of the storage device 24 can retract if the storage device 24 is a hard disk drive. If the storage device 24 is a flash memory drive, cutting power and stopping the transmission of data from the flash memory would be near to instantaneous. Having more buffer memory may also reduce the duration that the storage device 24 is running and aid in minimizing the parts movement duration of the storage device 24 (in the instance of a hard disk drive). This will allow the storage device 24 to be not reading or writing data more often, and for a shorter duration when doing so. The power to the storage device 24 can more quickly be cut when it is not running.

Whenever the controller 28 cuts power to the device 20, the date and time when such an instance happens is stored in the device 20 (36). Such information may be drawn out even if the device 20 is damaged, as it may provide an indication as to why, when and how the device 20 is damaged. For example, a device 20 with a record of more than a hundred instances of cutting power over a span of ten days may indicate an abusive or clumsy user of the device 20. The force sensor 26 may also be configured to indicate the greatest force that the device 20 or storage device 24 experienced during a drop or during an impact. This would be preferable as a feature for devices 20 that are designed for outdoor rugged use and are less fragile to show their inherent toughness.

It is preferred that data from the force sensor 26 is logged over a pre-determined period, such as, for example, four hours. As such, data from a preceding four hours is overwritten by data from the present four-hour period. However, the record of instances of device 20 cutting power is not overwritten.

Figure 3:
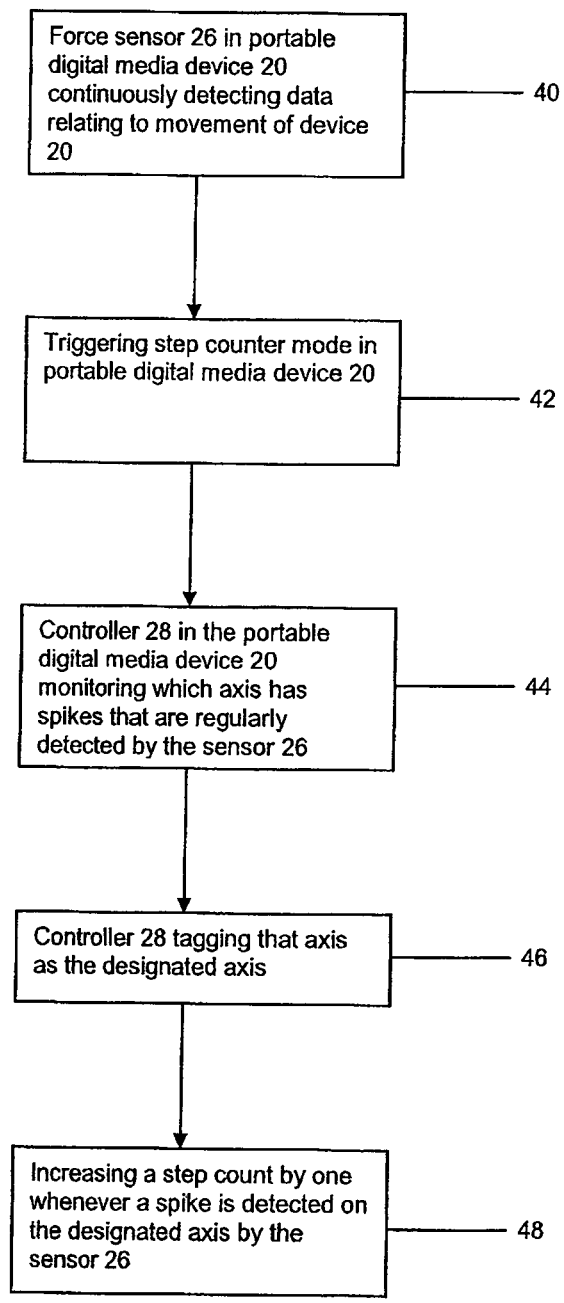
FIG. 3 is a process flow diagram for counting paces using the preferred embodiment.

Referring to FIG. 3, there is shown a process diagram of a method to count a number of steps a moving user takes using a portable digital media device 20. The user may be walking, jogging or running. In the device 20, the force sensor 26 is continuously detecting data relating to movement of the device 20 (40). A user triggers a step-counting mode by invoking a control such as, for example, a button, a switch, or a touchpad on the media device 20 (42). The controller 28 monitors the readings from the sensor 26 for a pre-determined time such as, for example, ten seconds and takes note of where spikes are regularly detected from one of the x, y, or z axes (44). This determines the orientation that the device 20 is held by the user. Once the controller 28 has confirmed the orientation of the device 20 and correspondingly, the axes where the spikes are regularly detected, that axes is tagged by the controller 28 as the designated axis (46). A pace count is increased by one whenever a spike in the designated axis is detected from the force sensor 26 (48). The number of steps may be re-settable to zero at the wish of the user. In a similar manner, the device 20 may also be usable for counting the incidence of skipping or jumping.

In addition, the controller 28 in the portable digital media device 20 may select a song from the storage device 24 in the media device 20 with a beat frequency that matches the detected spike frequency detected by the sensor 26 for the user.

The device 20 may also be able to function as a speedometer. Subsequent to the steps mentioned earlier for counting steps, should the user input the distance covered per step to the media device 20, the controller 28 would be able to determine a near-instantaneous speed using the formula:

$$\frac{(\text{Distance traveled per step}) \times (\text{No of steps taken in a pre-determined time})}{(\text{Pre-determined time})}$$

wherein the pre-determined time may be thirty seconds or any other duration of time.

Some other applications of the device 20 are anticipated. A device 20 left on a flat surface would be usable as a vibration sensor in earthquake-prone countries such as, for example, Japan and Indonesia. The device 20 may sound/indicate an alert to the user as a warning of impending danger when the sensor 26 in the device 20 detects spikes in acceleration in either one of the x, y or z axes for greater than a pre-determined time, such as, for example, thirty seconds. The device 20 could also be used as a data logger when recovered from debris and the exact time of tremors may be inferred from stored records like from a black box of an airplane.

The device 20 may have surveillance applications. The force sensor 26 of the device 20 may be connected to a voice recorder in the device 20 such that when vibrations above a pre-determined level are detected, the voice recorder may be activated to record all noises in the area around the device 20. Correspondingly, occurrences adjacent or around the device 20 may be recorded.

Having a force sensor 26 incorporated in device 20 may also cause the device 20 to be act as a cursor control and input device when connected to a computer either via a wire or wirelessly. As mentioned earlier, the force sensor 26 is able to measure acceleration in the x, y and z axes. In the present embodiment, where the x and y axes reside in a lateral plane, a change in the position of the device 20 in either one of the x, y or z axes causes the cursor on a display of the computer to move to a corresponding position relative to a reference position on the display that is determined from pre-calibrating the device 20. In the lateral plane (x and y axes), a coordinate system may be used to determine the position of the cursor on a display of the computer. For example, a reference position may be calibrated as (x1, y1). When the device is moved to a new position (x1+3, y1−5), the cursor on the display of the computer moves to a corresponding position relative to a reference position on the display. Correspondingly, a movement of the device 20 in the vertical z axes may be applicable for three dimensional movement of the cursor on the display of the computer where applicable.

The device 20 may be connected via a wire to the computer while charging its power source and/or downloading content into the device 20. The device 20 may also communicate with the computer wirelessly using protocols such as, for example, RF, IR, Bluetooth, UWB and so forth, as long as the appropriate transceivers are incorporated into the device 20 and the computer. A higher acceleration measured by the force sensor 26 may cause the cursor on the display of the computer to move faster. Controls on the device 20 may be used to select options on the display of the computer. When the device 20 is used as such, the cursor control and input functions may be used on any surface, unlike the optical mice that cannot be used on non-reflective surfaces. Having a media player which is also able to function as a cursor control and input device may also reduce the number of items that need to be carried by a user.

It should be noted that computer includes, but is not limited to, personal computers, desktop computers, laptop computers, notebook computers, tablet computers, and personal digital assistants.

Whilst there has been described in the foregoing description preferred embodiments of the present invention, it will be understood by those skilled in the technology concerned that many variations or modifications in details of design or construction may be made without departing from the present invention.

What is claimed is:

1. A portable digital media device, including:
   a storage device;
   a controller coupled to the storage device;
   a buffer memory; and
   a force sensor coupled to the controller, the force sensor being configurable to determine whether force has been exerted on the portable digital media device, the force sensor being one of:
      connectable externally to the storage device; and
      incorporable into the storage device in a manner such that when incorporated into the storage device, the force sensor is configurable for determining force experienced by the storage device when force is exerted on the portable digital media device,
   wherein when the force sensor determines that force has been exerted on the portable digital media device, the controller is configured to at least one of cut power to the portable digital media device and cut power to only the storage device, and the buffer memory is configurable to reduce activity of the storage device such that when power is to be cut, power can be more quickly cut;
   wherein the force sensor is further configurable to continuously log data in a manner so as to count a number of steps a moving user takes using the portable digital media device;
   wherein the controller is configurable for monitoring for a pre-determined time, where spikes are regularly detected in an axis selected from the group consisting of: x, y, and z;
   wherein the controller is further configurable for tagging that axis as the designated axis and increasing a step count by one whenever a spike in the designated axis is obtained from the force sensor; and wherein the controller is yet further configurable for selecting a song from the storage device in the media device with a beat frequency that matches the detected spike frequency for the user.

2. The portable digital media device as claimed in claim 1, wherein the storage device is selected from the group consisting of: flash memory and hard disk drive.

3. The portable digital media device as claimed in claim 1, wherein the force sensor is able to detect acceleration in one or more axes selected from the group consisting of: x, y and z; and wherein acceleration in one or more axes is indicative of force exerted on the portable digital media device.

4. The portable digital media device as claimed in claim 1 further including a display configurable for showing information, wherein the display shows information that relates to at least one of movement of the digital device, movement of the storage device, impact on the digital device, and impact on the storage device.

5. The portable digital media device as claimed in claim 1, wherein the portable digital media device is a cursor control and input device when connected to a computer;

wherein a cursor on a display of the computer moves at a rate corresponding with the acceleration detected by the force sensor; and wherein the connection to the computer is selected from a group comprising: via a wire and wirelessly.

6. The portable digital media device as claimed in claim 5, wherein the wirelessly protocol used is selected from the group consisting of: Bluetooth, UWB, RF and IR.

7. The portable digital media device as claimed in claim 5, wherein the connection via a wire to the computer is for at least one of the charging of a power source of the portable digital media device and downloading content into the portable digital media device.

8. The portable digital media device as claimed in claim 5, wherein controls on the media device is used to select options on a display of the computer.

9. The portable digital media device as claimed in claim 5, wherein the cursor control is based on a coordinate system.

10. A portable digital media device, including:
a storage device;
a controller coupled to the storage device; and
a force sensor coupled to the controller, the force sensor being configurable to determine whether force has been exerted on the portable digital media device, the force sensor being one of:
connectable externally to the storage device; and
incorporable into the storage device in a manner such that when incorporated into the storage device, the force sensor is configurable for determining force experienced by the storage device when force is exerted on the portable digital media device,
wherein the controller in the device is configurable to cut power to the storage device at an instance when a decreasing acceleration in at least one of axes x, y and z is recorded over a duration of time, and wherein the times, and incidence of the cutting of power to the storage device are stored in the digital device;
wherein the force sensor is further configurable to continuously log data in a manner so as to count a number of steps a moving user takes using the portable digital media device;
wherein the controller is further configurable for monitoring for a pre-determined time, where spikes are regularly detected in an axis selected from the group consisting of: x, y, and z;
wherein the controller is yet further configurable for tagging that axis as the designated axis and increasing a step count by one whenever a spike in the designated axis is obtained from the force sensor; and
wherein the controller is yet further configurable for selecting a song from the storage device in the media device with a beat frequency that matches the detected spike frequency for the user.

11. The portable digital media device as claimed in claim 10, wherein data from the force sensor is logged over a pre-determined period and data from an earlier pre-determined period is overwritten by data from a present period.

* * * * *